UNITED STATES PATENT OFFICE.

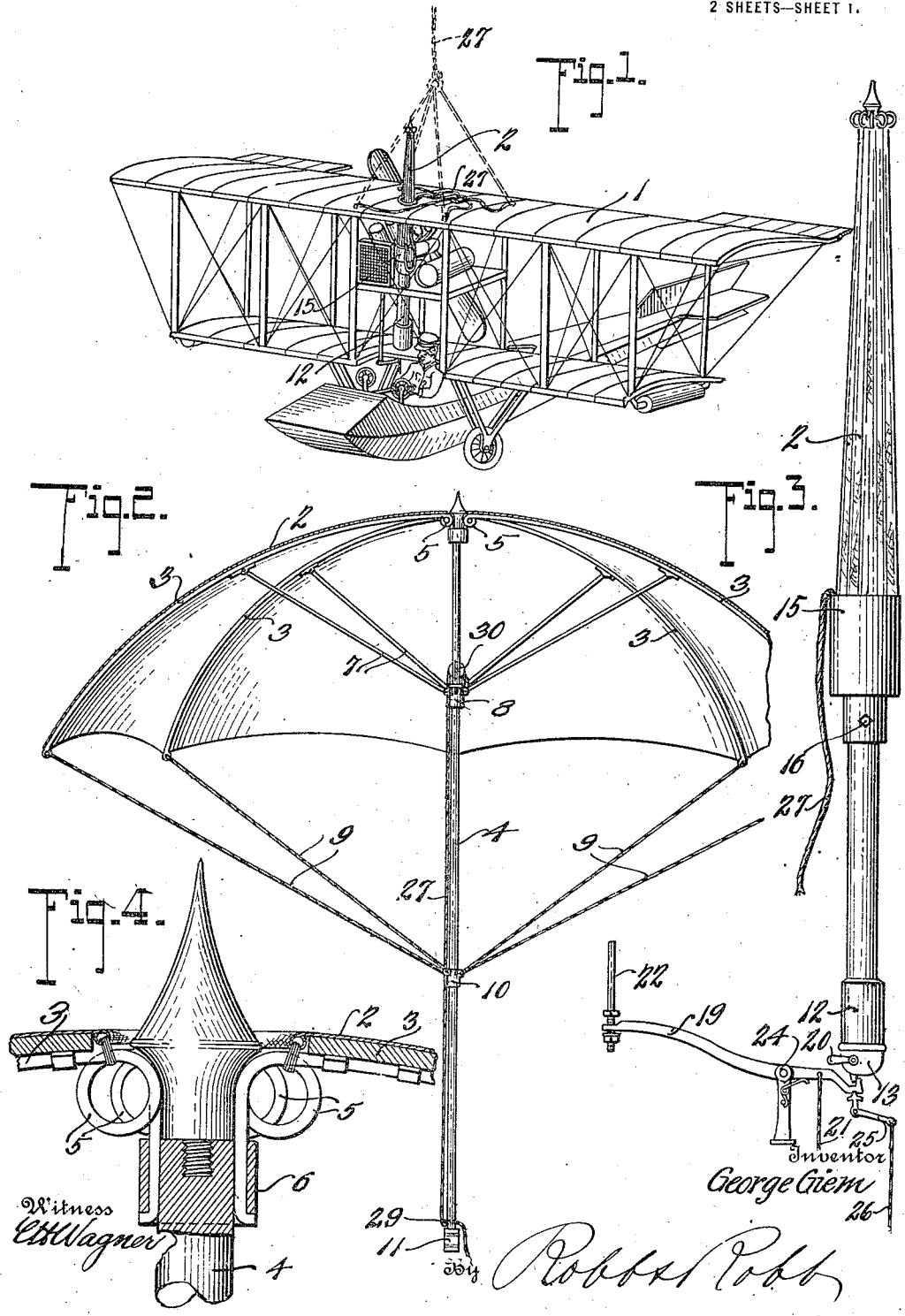

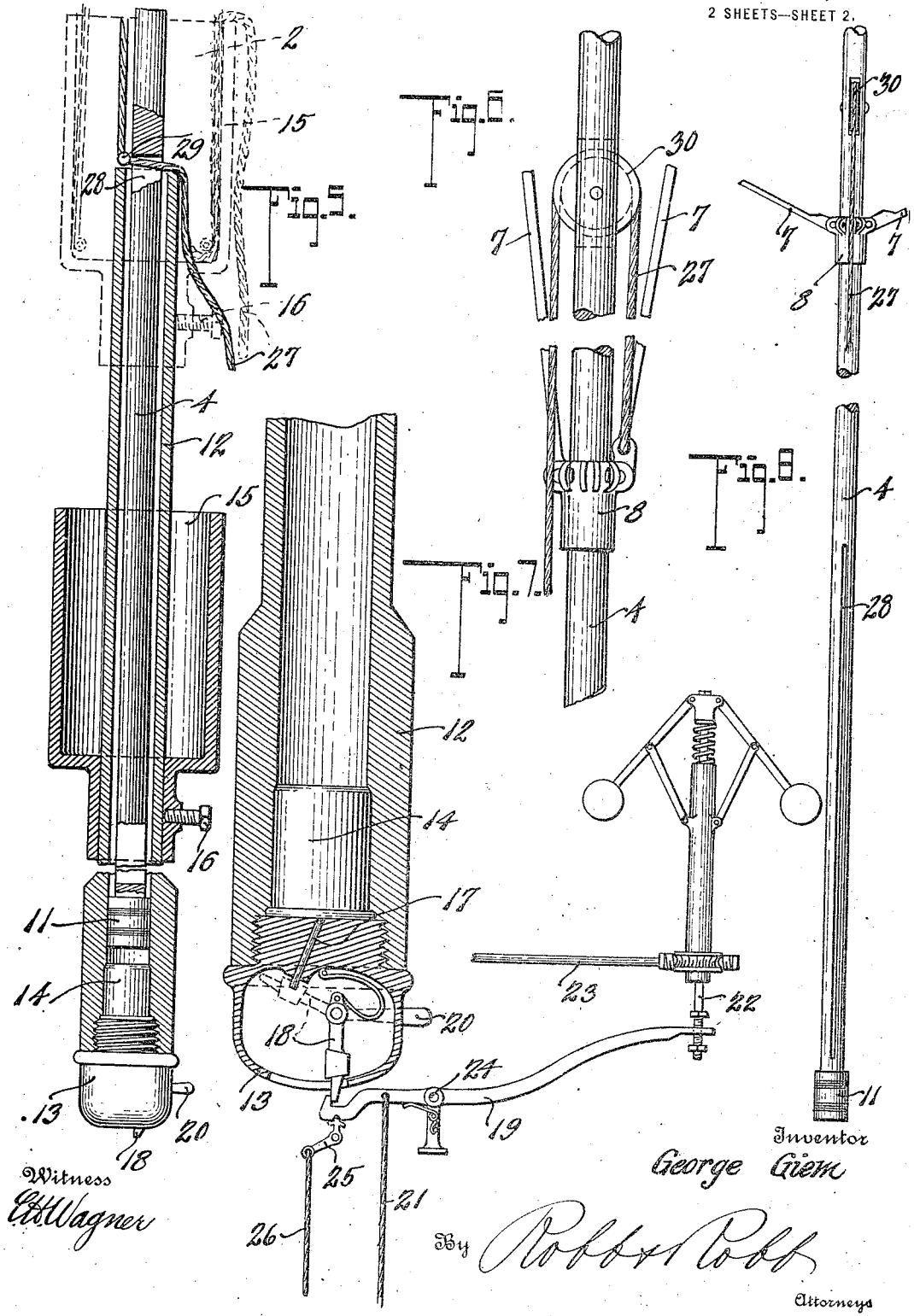

GEORGE GIEM, OF PALMER LAKE, COLORADO.

SAFETY APPLIANCE FOR FLYING-MACHINES.

1,173,948.  Specification of Letters Patent.  Patented Feb. 29, 1916.

Application filed June 29, 1915. Serial No. 37,071.

*To all whom it may concern:*

Be it known that I, GEORGE GIEM, a citizen of the United States, residing at Palmer Lake, in the county of El Paso and State of Colorado, have invented certain new and useful Improvements in Safety Appliances for Flying-Machines, of which the following is a specification.

The present invention relates to improvements in safety devices broadly and comprehends the provision of auxiliary sustaining means designed as an attachment for airships or flying machines for the purpose of preventing the rapidity of descent and resulting disasters both to apparatus and occupants thereof upon disablement of the main sustaining means.

To this end the invention consists of a collapsible sustaining means in the form of a parachute, normally disposed in inoperative position on the flying machine, discharging means for rendering the parachute effective as a sustaining member, and means for automatically operating the discharge means either under control of the prime mover of the machine, according to its status, or under the control of the operator, or both.

An object, therefore, in view is to provide such discharging means as referred to, the same consisting of a gunlike casing in which the parachute stick is normally seated in position for projection by an explosive, a hammer, and means intermediate the flying machine engine and the hammer for automatically releasing the latter in the event said engine becomes disabled.

A further object is to provide a manual control for said releasing means whereby it may be operated at will to accomplish the discharging function, and also locking means for rendering said releasing means operative or inoperative as desired.

Lastly, another object is to provide a special connection between the parachute and the flying machine such that upon discharge or projection of the former, complete spreading of the sustaining surface will be insured.

These and such other objects as may hereinafter appear are attained by the novel construction, combination and arrangement of parts to be hereinafter specifically described and claimed.

Reference will now be had to the accompanying drawings forming a part of this specification, wherein:

Figure 1 is a perspective view showing the application of my safety appliance to a conventional type of airship. Fig. 2 is a vertical sectional view of the parachute in extended sustaining position. Fig. 3 is a side elevation of the parachute in collapsed form and its discharging mechanism. Fig. 4 is an enlarged fragmentary sectional view, showing more clearly the manner of connecting the parachute sustaining surface to its supporting stick. Fig. 5 is an enlarged sectional view of the lower portion of the parachute and its carrier, and showing in dotted lines the adjustment of the retaining means for the parachute sustaining surface. Fig. 6 is a detail fragmentary view of the lifting arrangement for extending the parachute. Fig. 7 is a fragmentary sectional view of the discharge means for the parachute, showing in elevation its firing mechanism and the operative connection between said discharge means and the prime mover for the flying machines; and Fig. 8 is a fragmentary side elevation of the parachute supporting stick.

Throughout the following detail description, and on the several figures of the drawings, similar parts are referred to by like reference characters.

Referring to Fig. 1 of the drawing, the numeral 1 designates a conventional type of airship to which the safety appliance forming the subject-matter of this application is connected. Said safety device consists primarily of a collapsible and auxiliary sustaining means of umbrella or parachute form, the details of construction of which will now be set forth. At 2 is designated the sustaining surface or envelop of the parachute construction connected in any well known manner to the rib members 3, said rib members being attached to a supporting stick 4 as shown in Fig. 4 particularly, by means of spring members 5 secured in position on said stick by the collar 6. It may be here stated that the springs 5 assist in the spreading of the sustaining surface 2, when once the rib members have been released from their retaining sheath, to be more particularly described hereinafter. The rib members 3 have connected thereto spreader bars 7 which are also connected to a guide sleeve or runner 8 slidably mounted upon the stick 4. The sustaining surface 2, furthermore, is vraced or limited in its extension by means of the retaining cables or cords 9 connected to the extremities of the ribs at one end and to the fixed collar or sleeve 10 on the stick 4 at the other end. It will be observed that the lower end of the stick 4 is formed with an enlarged head 11 which in the disposition of the parachute upon the flying machine is adapted to be received along with the lower portion of the stick 4 into a casing 12, said casing constituting an element of the discharge means for projecting the parachute in the event of the necessity for auxiliary sustaining means. As a matter of fact, the casing 12 may be considered to be a gun and consists of a removable breech block 13 at its lower extremity which is adapted to be screwed thereinto after the insertion of a cartridge 14 into the explosion chamber of this casing. The cartridge, as will be apparent from Fig. 5, is located just below the enlarged head 11 of the parachute stick 4 and naturally, upon the explosion of the cartridge, projection of the parachute construction will result. In its collapsed position, most clearly shown in Fig. 3 of the drawing, the sustaining surface 2 is held in inoperative position by means of an adjustable retaining member or sheath 15 surrounding the casing 12 and held thereon at adjusted position by means of the set screw 16. This sheath obviously may be moved upwardly or downwardly on the casing into engagement with the sustaining surface 2 and its ribs so as to hold the same as hereinbefore mentioned from unauthorized extension.

The firing control for the discharge means will now be set forth. The breech block 13 carries a firing pin 17 for exploding the cartridge 14 and a spring actuated hammer 18 adapted to impinge against said pin upon release of the same from the releasing member 19. The hammer 18 is provided with a handle 20 by means of which said hammer may be set or engaged with the releasing member 19 as most distinctly shown in Fig. 7 of the drawing. The releasing member 19 has a dual control, being provided with a manual firing cable 21 which represents broadly an operating element for the operator of the flying machine, this cord or its equivalent, being arranged at a convenient point for the operator and by means of which the releasing member 19 may be disengaged from the hammer 18 at will. The releasing member 19 is a lever, spring actuated, for holding it in engaging position with respect to the hammer 18 and said lever constitutes an operative connection between the hammer or the firing mechanism for the parachute broadly and the sustaining means for said flying machine which may be for the purposes of this application, the prime mover. In order that the operation of the release member 19 may be automatic in its action, it is connected to the governor stem 22, the governor being driven in any desired manner, as by means of the shaft 23 from the engine shaft. It will, therefore, follow that in the event of disablement of the prime mover, which results in stoppage of said engine, followed by a loss of propelling power for the flying machine, the stem 22 of the governor will be elevated, thereby carrying with it one end of the release lever 19 which moving upon its pivot 24, disengages its opposite end from the hammer 18 allowing said hammer to explode the cartridge in the manner hereinafter described, with the result that the parachute is projected from its casing. In connection with the control of this firing mechanism, I prefer to employ locking means whereby to prevent either accidental or undesired release of the hammer 18 and for this purpose provide a locking member 25 engaging the releasing lever 19 at one side of its pivot and having connected thereto the cable or cord 26 by means of which the locking member may be disengaged from the releasing lever to render it operative.

The firing control hereinbefore described, it will be recognized, is under the control both of the operator and of the flying machine propelling means, subject to the preliminary rendering of said control operative. That is to say, during flights of the airship, the operator of the machine may render the firing control operative either for actuation manually or for automatic actuation under the control of the engine by disengaging the locking means. If there is no reason for rendering the safety appliance of this invention operative, said locking means may be allowed to remain in position which will prevent either accidental release or automatic release of the firing mechanism. This dual control, therefore, is very advantageous since it insures the proper operation of the safety device or appliance irrespective of whether the operator of the airship himself is capable of carrying out the discharging function or not.

Passing now to a further feature of this apparatus, it will be noted in the drawings that the parachute is provided with a special supporting connection by means of which it is attached to the airship. This connection is in the form of a cable 27 which at one end may be suitably attached to the airship in the manner shown by dotted lines in Fig. 1 of the drawings. The cable 27 passes through a slot 28 which extends longitudinally of the supporting stick 4 to a point just above the mouth of the casing 12, as shown in Fig. 5. An adjustable stop button 29 is connected to the cable at a point adjacent to the portion passing through the slot just mentioned and said cable extends upwardly over a pulley 30 located in said stick adjacent to the upper portion thereof and is connected to the runner 8 at its extremity. It will be apparent that the slot 28 provides for the shifting of the cable upwardly along the stick to a point beyond the mouth of the casing as hereinbefore mentioned, but as soon as the parachute is discharged from its casing and the extension of the parachute renders its sustaining surface effective, the descent of the flying machine to which it is attached draws the cable taut and in so doing said cable slides downwardly in the slot until it reaches its lower extremity where the stop member 29 prevents further separating movement of the machine and parachute. In the movement of the cable downwardly the sleeve or runner 8 is caused to be drawn upwardly along the stick by the cable and the spreader members, therefore, forcibly expand the sustaining surface of the parachute. In the projection of the parachute it will be obvious that this extension is almost incapable of failure, first, for the reason that the gases from the explosive charge take effect upon the sustaining surface as they pass out of the casing 12, then the springs at the head of the stick also assist the extension action, and finally, the forcible extension of said sustaining surface by the cable connection 27 completes the actuation of this auxiliary sustaining means.

It is thought needless to specifically describe further the operation of this device having in view the foregoing description, though it may be stated that the relative size, proportion, and details of construction of the parachute are susceptible of variation to provide for proper sustaining power for the flying machine to which the appliance may be attached. It is immaterial as to what accident may happen to the flying machine, practically, since the operation of the safety appliance is both under the control of the operator as well as under the control of the primary sustaining means for said flying machine. Thus it is apparent that should the main wings or stabilizing means become inoperative or disabled, the operator can effect the actuation of the discharging mechanism for the parachute and on the contrary if the engine or propelling means for said parachute fails it automatically renders the safety appliance effective though not necessarily so unless the operator has so set the discharging mechanism as to be capable of automatic actuation.

Having thus described my invention, what I claim as new is:

1. In a safety device of the class described, the combination of a flying machine and auxiliary sustaining means normally disposed in inoperative position, discharging mechanism for rendering the sustaining means effective, means for automatically operating the discharge mechanism upon disablement of the main sustaining means of said machine, and controlling means for rendering the automatic operating means effective or ineffective at will, comprising a locking member movable into and out of contact with the operating means aforesaid.

2. In a safety device of the class described, the combination with a flying machine, of auxiliary sustaining means comprising a parachute disposed in inoperative position on said machine, discharging mechanism for rendering said parachute effective, including a hammer member, a lever arranged adjacent to the hammer member and adapted for engagement with said hammer member at one end thereof, automatic control means coacting with the other end of said lever and operable to cause disengagement of the hammer member, locking means engageable with the hammer engaging end of the lever aforesaid, and means for actuating the locking means to release the lever.

3. In a safety device of the class described, the combination with a flying machine, of auxiliary sustaining means comprising a parachute disposed in inoperative position on said machine, discharging mechanism for rendering said parachute effective, including a hammer member, a lever arranged adjacent to the hammer member and adapted for engagement with said hammer member at one end thereof, automatic control means coacting with the other end of said lever and operable to cause disengagement of the hammer member, locking means engageable with the hammer engaging end of the lever aforesaid, means for actuating the locking means to release the lever, and manual means connected to the lever for releasing the hammer independently of the automatic control.

4. In a safety appliance of the class described, the combination of a parachute, discharging mechanism for rendering said parachute effective for sustaining purposes comprising a gun, firing mechanism for said gun comprising a removable charge sustaining member, a firing hammer carried thereby, a spring actuated hammer engaging member for holding the latter in firing position, and means for releasing the spring actuated member.

5. In combination, a flying machine, a safety appliance therefor comprising a parachute, a tubular casing on said machine normally carrying the parachute in collapsible condition, said parachute surrounding the casing, an adjustable retainer surrounding the casing and engaging the ends of said parachute for retaining the same in collapsed condition, and means for discharging the parachute from said casing.

6. In combination, a flying machine, a safety appliance therefor comprising a parachute, a casing in which the parachute is disposed in collapsed condition, explosive means for discharging the parachute from the casing, means for controlling the firing of the explosive means aforesaid, adjustable means on said casing for retaining the parachute normally in collapsed condition, and locking means for holding the adjustable means at adjusted positions.

7. A safety appliance for flying machine, comprising a collapsible sustaining member, spreader means therefor, a stick to which the sustaining member is connected, a cable connecting said sustaining member to the flying machine, means attached to one end of the cable and to the spreader means for actuating the latter to effect extension of the sustaining member upon discharge of the same from the flying machine, and stop means connected to said cable and coöperative with the stick aforesaid for limiting relative movement of said sustaining member with respect to the flying machine.

8. A safety appliance for flying machines comprising a collapsible parachute, a stick to which the parachute is connected, means for projecting the parachute to render the same effective for sustaining purposes, comprising a gun, spreader means coöperative with the stick, an operative connection intermediate the spreader means and the flying machine having shiftable connection with the stick whereby to permit of introduction of said stick into the gun, and stop means carried by said operative connection for limiting the shifting action thereof with respect to the stick.

9. A safety appliance for flying machines comprising a parachute, a supporting stick therefor, said stick having a slot extending longitudinally thereof, a cable connected at one end to said flying machine, spreading means on the stick to which the cable is connected at its other end, said cable passing through the slot aforesaid, and stop means on said cable for limiting relative movements of the parachute with respect to the machine.

10. A safety appliance for flying machines, a parachute, a casing on the flying machine in which the parachute is disposed in collapsed position, an adjustable sheath on said casing for retaining the parachute in collapsed condition, an operative connection between the parachute and the flying machine, and means for projecting said parachute, said means comprising an explosive charge disposed in said casing, a firing member therefor, a release member coacting with the firing member, a firing cable connected to the release member, and a locking member associated with said release member for rendering the latter operative and inoperative.

In testimony whereof I affix my signature.

GEORGE GIEM.